US010009688B2

(12) United States Patent
Butler

(10) Patent No.: US 10,009,688 B2
(45) **Date of Patent: *Jun. 26, 2018**

(54) DIGITAL COMMUNICATION SYSTEM FOR LOUDSPEAKERS

(71) Applicant: Dolby Laboratories Licensing Corporation, San Francisco, CA (US)

(72) Inventor: Joel Butler, Springfield, MO (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/436,290

(22) Filed: Feb. 17, 2017

(65) Prior Publication Data

US 2017/0164111 A1 Jun. 8, 2017

Related U.S. Application Data

(63) Continuation of application No. 14/656,380, filed on Mar. 12, 2015, now Pat. No. 9,615,169, which is a (Continued)

(51) Int. Cl.
*H04B 3/00* (2006.01)
*H04R 3/12* (2006.01)

(52) U.S. Cl.
CPC ........... *H04R 3/12* (2013.01); *H04R 2420/07* (2013.01)

(58) Field of Classification Search
CPC .... H04R 27/00; H04R 2227/003; H04R 5/02; H04R 3/12; H04R 3/00; H04R 1/345; (Continued)

(56) References Cited

U.S. PATENT DOCUMENTS 4,621,374 A * 11/1986 Micic .................... H04L 1/0057 370/522
4,862,159 A * 8/1989 Marusa .................... H03G 3/00 340/4.37

(Continued)

FOREIGN PATENT DOCUMENTS

| | | | | |
|---|---|---|---|---|
| EP | 0886456 A2 * | 12/1998 | ............... | H04R 3/04 |
| GB | 2123193 A * | 1/1984 | ............. | H04R 27/00 |
| WO | WO 2012012315 A1 * | 1/2012 | .......... | H04M 1/6066 |

*Primary Examiner* — Leshui Zhang

(57) ABSTRACT

A communication system for communicating with at least one loudspeaker is described where the loudspeaker is connected to audio equipment over standard two-wire speaker wire operable to carry an audio signal. The communication system includes a master node in electrical communication with a signal path carrying the audio signal between the audio equipment and the loudspeaker, the master node also including an interface with the audio equipment, a data encoder operable to encode data signals, a data transceiver operable to place the data signals onto the audio signal at frequencies above audio frequencies. The communication system also includes at least one slave node in electrical communication with the audio signal and each loudspeaker, the slave node including a data transceiver operable to receive data signals from the master node, a data decoder, and an interface able to communicate with the loudspeaker.

20 Claims, 10 Drawing Sheets

Related U.S. Application Data continuation of application No. 12/910,586, filed on Oct. 22, 2010, now Pat. No. 9,014,390.

(60) Provisional application No. 61/254,069, filed on Oct. 22, 2009.

(58) Field of Classification Search

CPC .............. H04R 1/403; H04R 2201/028; H04R 29/007; H04R 3/007; H04R 3/04; H04R 2420/05; H04R 2420/07; H04R 29/00; H04R 1/02; H04R 29/001; H04R 5/00; H04B 3/00; H04B 3/54; H04B 2203/5408; H04B 2203/5445; H04B 2203/5454; H04B 2203/545; H04N 21/234327; H04N 21/2662; H04N 21/439; H04N 21/8113; H04N 7/152; H04M 1/00; H04W 4/01; H04Q 9/00

USPC ......... 381/1, 26, 28, 309, 61, 317, 313, 321, 381/322, 312, 324, 326, 329, 330, 3, 31, 381/71.7, 71.11, 71.12, 72, 74, 79, 83, 381/84, 334, 91, 92, 93, 94.1, 9, 5, 100, 381/102, 10, 106, 111, 120, 122, 77, 82, 381/96, 59, 332, 335; 455/552.1, 553.1, 455/556.1; 181/30, 139; 700/94

See application file for complete search history.

(56) References Cited

U.S. PATENT DOCUMENTS 4,922,536 A 5/1990 Hoque
5,369,784 A * 11/1994 Nelson .................. H04B 7/155 370/350
5,386,590 A * 1/1995 Dolan ...................... H04B 1/38 375/223
5,406,634 A * 4/1995 Anderson .............. H04R 27/00 381/80
5,729,611 A * 3/1998 Bonneville ............... H03F 1/52 381/55
6,044,307 A * 3/2000 Kamiya ........... G11B 20/00992 381/1
6,097,289 A * 8/2000 Li ............................ G08B 3/10 340/326
6,385,322 B1 5/2002 Mietling
6,466,832 B1 * 10/2002 Zuqert ..................... H04R 3/14 700/94
6,621,909 B1 * 9/2003 Webb ....................... H04R 1/30 181/144
6,766,025 B1 * 7/2004 Levy ........................ H04R 3/04 381/56
7,031,476 B1 * 4/2006 Chrisop ................... H04R 3/00 381/332
7,929,863 B2 * 4/2011 Yu .......................... G08C 17/02 398/109
8,214,874 B2 * 7/2012 Nathan ............ G06F 17/30017 713/193
8,462,961 B1 * 6/2013 Bywaters ............ H04L 12/1895 381/77
8,494,185 B2 * 7/2013 Yamkovoy .......... H04M 1/6066 330/11
8,582,263 B2 11/2013 Butler
2003/0125954 A1 * 7/2003 Bradley ............ H04M 3/42042 704/270
2004/0091122 A1 * 5/2004 Bavholm ............. H04R 29/007 381/80
2005/0131558 A1 * 6/2005 Braithwaite ..... H04N 21/23432 700/94
2006/0221970 A1 * 10/2006 Walter .............. H04L 29/06027 370/392
2007/0069930 A1 * 3/2007 Butler ................... H03F 3/2175 341/143
2007/0121981 A1 5/2007 Koh et al.
2007/0242780 A1 * 10/2007 May ..................... H04B 1/0007 375/340
2008/0056507 A1 * 3/2008 Logvinov ................ H04B 3/54 381/77
2008/0069392 A1 * 3/2008 Hofrichter ............... H04R 3/00 381/394
2008/0259966 A1 * 10/2008 Baird .................... H04J 3/0632 370/503
2012/0045009 A1 * 2/2012 Schleicher ......... H04B 1/71635 375/268
2013/0235912 A1 * 9/2013 Masuda .............. H04L 25/0272 375/219
2014/0086418 A1 * 3/2014 Lubberhuizen ........ H04R 9/022 381/55

* cited by examiner

*FIG. 8*
820
ALL-CALL
INTERROGATION DATA
UP_DAT
PWR_MOD
SLAVE 1
DOWNLINK REPLY
SLAVE 1 DN_DAT
SLAVE 1 DN_MOD
SLAVE 2
DOWNLINK REPLY
SLAVE 2 DN_DAT
SLAVE 2 DN_MOD
SLAVE 3
DOWNLINK REPLY
SLAVE 3 DN_DAT
SLAVE 3 DN_MOD
22
PMBL
DATA
REPLY DELAY SLAVE 1 30
REPLY DELAY SLAVE 2 32
REPLY DELAY SLAVE 3
34
24
26
28
29
UID:SLAVE 3

DIGITAL COMMUNICATION SYSTEM FOR LOUDSPEAKERS

CROSS REFERENCE TO RELATED APPLICATIONS

This application is a continuation of U.S. application Ser. No. 14/656,380 filed Mar. 12, 2015 for "Digital Communication System for Loudspeakers", which is a continuation of U.S. application Ser. No. 12/910,586 filed Oct. 22, 2010 for "Digital Communication System for Loudspeakers", which claims the benefit of U.S. Provisional App. No. 61/254,069 filed Oct. 22, 2009 for "Digital Communication System for Loudspeakers", the entire contents of all of which are hereby incorporated by reference.

TECHNICAL FIELD

The present disclosure is directed to communication system designed to provide digital data transmission and reception between a loudspeaker and remote transceiver, while operating in the presence of potentially large audio band signals.

BACKGROUND

Loudspeakers are generally passive complex loads connected to an audio amplifier by standardized two-wire load speaker wiring designed to carry high-voltage, high-current analog signals in the audio frequency band. Some loudspeakers can be powered, that is have an external power source and powered components, such as a subwoofer with an internal amplifier, but these too are generally connected to the audio source by a two-wire connector which delivers the audio signal to be reproduced. As wired loudspeakers are seen as passive system components with fixed load characteristics, there has not been any need to communicate or pass data and control signals between the amplifier and the loudspeaker.

Some technologies are emerging that would make it desirable to have a communication path between a loudspeaker and the amplifier. An example of such a technology is described in U.S. Pat. No. 8,582,263 by Butler, which is hereby incorporated by reference. The system described in the Butler patent provides for a mechanism at the loudspeaker to attenuate the audio signal in over-voltage, overcurrent or other over-limit conditions. The mechanism also allows for the attenuation of the audio signal for artistic or logistics reasons, such as varying the strength of the audio signal to each speaker in a bank of speakers, even if there is no threat to the loudspeaker.

In the system described in Butler, loudspeakers equipped with digital attenuators have the intelligence to digitally attenuate the AC input signal, monitor voltage, electrical current, temperature, frequency, cone movement, and/or other limiting values. Such intelligent loudspeakers can benefit greatly from the present invention wherein the monitored values and attenuation characteristics can be communicated to a remote device or devices residing elsewhere in the loudspeaker wiring path. For example, the intelligent loudspeaker equipped with digital attenuation and limit monitoring can pass the monitored values and/or attenuator settings to remote devices, which in turn can change the parameters of the digital attenuator from afar. This can be beneficial in systems where a user desires to attenuate a specific speaker which resides in a chain of connected loudspeakers or the user simply wishes to monitor the performance and characteristics of a specific loudspeaker from afar.

Other applications wherein a transparent digital communication system for use within passive, un-powered loudspeakers can be beneficial include, but are not limited to: audio systems that utilize Digital Signal Processors (DSP) for loudspeaker processing and equalization, and audio systems that require advanced status monitoring and/or diagnostic support. Audio systems that utilize DSP for loudspeaker processing and equalization can benefit from the present invention by receiving an electronic identification from the un-powered loudspeakers. Once the DSP has received the loudspeakers identification (make, model, serial number, etc.), the DSP can automatically recall the appropriate signal processing algorithms required for that specific loudspeaker. For example, many modem professional audio amplifiers contain on-board DSP processors that provide the user with a host of signal processing tools such as filtration, delay, gain, phase shifting, etc.; however, the user must configure the DSP parameters for the loudspeaker connected thereto. By incorporating the invention disclosed herein, the properly equipped loudspeaker can identify itself to the amplifier and DSP processor, thereby allowing immediate recall of the correct DSP parameters. This provides a "plug-and play" capability not seen before with un-powered loudspeakers.

Another general application for the present invention is within audio systems requiring status monitoring and/or diagnostic support. In such systems, the audio designer desires to monitor as many audio components as possible, thereby providing a more comprehensive understanding of the operating conditions of each component within the overall system. In the past, un-powered loudspeakers have not provided any mechanisms for status monitoring. By applying the present invention, un-powered loudspeakers can now broadcast loudspeaker status and other performance characteristics to remote devices residing on the loudspeaker wiring. These remote devices can display the information via a computer interface and/or a local user interface. Though not limited to, the present invention can be used to pass diagnostic information such as driver temperature, voltage, current, cable phase, and/or impedance. This information can be invaluable to system operators, contractors, and installers while operating, installing, and/or commissioning an audio system.

SUMMARY

The concepts described herein encompasses a communication and identification system designed to provide digital data transmission, reception, remote powering, and identification between passive, un-powered loudspeakers and remote transceivers, while operating in the presence of potentially large analog audio band signals. The communication and identification system provides transmission and reception of digital data and power to an un-powered loudspeaker at frequencies higher than the analog audio band, 20-20 kHz, while propagating over the standard amplifier-to-loudspeaker interconnect wiring (typically a two-conductor, unshielded, stranded, high voltage/current, wire). This allows "transparent" digital communication to occur without adversely affecting the analog audio band output of the amplifier and does not create any audible artifacts at the loudspeaker. In this manner, the un-powered loudspeaker can, among other uses, (1) contain digital electronics that is remotely powered even during conditions where no audio input signal is present; (2) communicate with other devices residing on the loudspeaker wiring (amplifiers, other loudspeakers, monitoring devices, network bridging devices, etc.); and (3) broadcast an identification message to remote devices residing on the loudspeaker wiring.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

The concepts set forth herein describe a communication and identification system that allows communication between audio and sound processing equipment and loudspeakers typically connected over standard audio wiring. Preferred embodiments of the communication and identification system described herein is broadly comprised of two distinct elements, master nodes and slave nodes. The slave nodes typically reside within un-powered loudspeakers, while master nodes would typically be installed in remote devices such as audio amplifiers, system monitoring devices, or network bridging devices. One or more of the master nodes can supply a high-frequency powering signal to the slave nodes, wherein the slave nodes recover the high frequency power transmission for powering various slave electronics. In addition to the high frequency power recovery, slave nodes can derive power from any audio signals present at the loudspeaker input if so desired. Multiple slave nodes can reside on a single pair of loudspeaker wires, recover power, transmit and receive digital data, and mitigate bus contention.

Embodiments of the slave nodes described herein broadly contain a power recovery stage, a high frequency data transceiver stage, a decoder/encoder stage, and an interface control stage. Embodiments of the master nodes described herein broadly contain a high frequency power transmitter stage, a high frequency data transceiver stage, a decoder/encoder stage, and an interface control stage. It should be apparent to one skilled in the art of digital communication systems that the decoder/encoder and high frequency transceiver stages can be implemented using a variety of different techniques and devices. While several alternative implementations for the high frequency transceiver stages are disclosed herein, one skilled in the art will recognize that there are many other implementations that are well within the scope of the concepts described herein.

Generation of the high frequency modulation signals used in the invention can be done using a variety of existing digital communication techniques including, but not limited to, Frequency Shift Keying (FSK), Phase Shift Keying (PSK), Pulse Amplitude Modulation (PAM), On-Off Keying (OOK), Minimum Shift Keying (MSK), etc. Many of these modulation techniques can be found on integrated circuit solutions, which can be used within the invention. In addition to modulation techniques, channel throughput can be increased by using Frequency Division Multiplexing (FDM) to increase the number of available frequency bands for data transmission. Furthermore, channel coding can be implemented with or without the use of error correction or detection, and encoding may be implemented with standard techniques such as Manchester Encoding.

Figure 1:
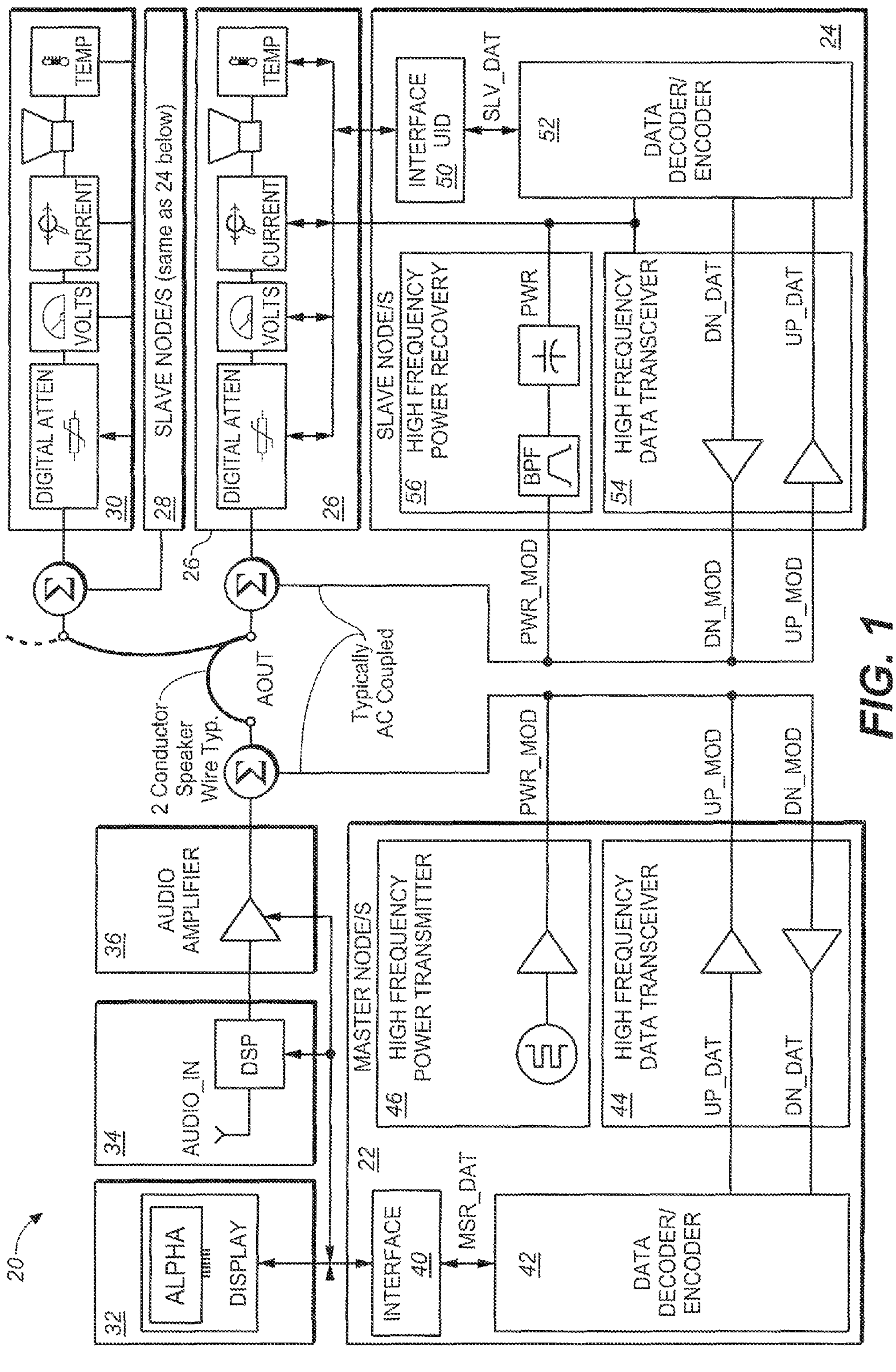
FIG. 1 is a block diagram of a preferred embodiment of a communications system according to the concepts described herein.

Referring now to FIG. 1, a simple block diagram of an embodiment of a communications system 20 show the typical components of a communication system according to the concepts described herein, including at least one master node 22 broadly consisting of a high frequency power transmitter 46, a high-frequency data transceiver 44, a data decoder/encoder 42, and an interface and control stage 40. In a preferred embodiment, master node 22 is operable to generate several signals, (1) a high-frequency power signal PWR_MOD and (2) one or more high frequency modulated uplink signals, such as UP_MOD. The signals generated from the master node are typically AC coupled to the speaker wiring for summation, which will function as a two conductor bus for the communication system AOUT. High frequency power transmitter stage 46 is operable to generate a high frequency power signal PWR_MOD for passage to the audio output wiring AOUT. High frequency power signal PWR_MOD can be derived from an oscillator with appropriate low-impedance drive and filtration for bandwidth limiting. Though not limited thereto, frequency selection for PWR_MOD is typically lower than the uplink and downlink modulated data signals to achieve improved power transfer from the master nodes to the slave nodes as shown in frequency spectral plot of FIG. 9.

Frequency allocation of master node 22 and slave node 24 transmitted signals can vary depending upon the application; however, the invention is operable to provide transparent communication in the presence of large audio-band signals by selecting transmission frequencies well above the audio band, which is typically defined as 20 Hz to 20 kHz. Therefore, the preferred embodiments of the present invention typically transmit all power and data signals, PWR_MOD, UP_MOD, and DN_MOD, in the region above 100 kHz and less than 20 MHz. For operation with switching audio amplifiers, it is generally desirable to select transmission frequencies above 1 MHz. Also, it is possible to select a common frequency for both the master node 22 uplink signal UP_MOD, and slave node 24 downlink signal DN_MOD; however, the communication system will only provide half-duplex communication. Therefore, it is preferred to use differing frequencies for uplink and downlink, full duplex communication.

Figure 9:
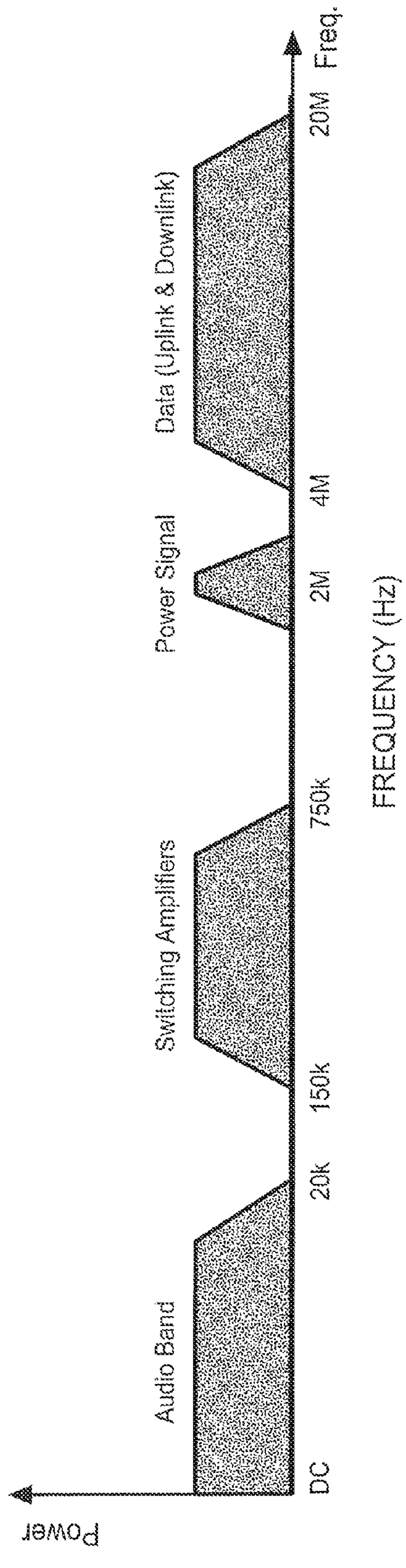
FIG. 9 is a frequency spectrum plot over the frequencies pertaining to for a communications system as described herein.

High frequency data transceiver 44 of master node 22 operates to (1) demodulate the high frequency downlink data signal DN_MOD received from the slave node 24 and pass the demodulated signal DN_DAT to data decoder/encoder 42 for processing; (2) modulate the incoming uplink data stream UP_DAT received from the decoder/encoder stage 42 to derive therefrom a high frequency modulated uplink signal UP_MOD for passage to the audio output wiring AOUT. Modulation techniques employed within the high frequency transceiver can vary and implementation options can range from complete integrated solutions, to discrete implementations. Frequency allocation of uplink, downlink, and power modulated signals, UP_MOD, DN_MOD, and PWR_MOD are typically selected well above the audio band as shown in FIG. 9.

The data decoder/encoder stage 42 within master node 22 operates to (1) encode and generate the outbound uplink data UP_DAT, (2) decode the incoming downlink data DN_DAT, and (3) communicate with the interface control stage 40 through the bi-direction data digital data bus MSR_DAT. Data encoding within stage 42 broadly receives master data MSR_DAT from the interface and control stage 40, applies any desired channel coding, error correction, data packetization, and framing to derive the outbound uplink data signal UP_DAT for passage to high frequency transceiver stage 44. Similarly, data decoding within stage 42 broadly receives the downlink data stream DN_DAT from high frequency transceiver stage 44 and applies error detection and/or correction, removes framing and/or channel codes, and un-packs the data packets for passage to the interface and control stage 40 via the bi-directional data bus MSR_DAT. Decoder/encoder stage 42 is typically implemented within a microcontroller, programmable logic device, communication integrated circuit, and/or application specific integrated circuit.

Interface and control stage 40 of master node 22 operates to (1) interface with external devices and/or sensors such as amplifier 36, DSP processor 34, and/or user interface display 32; (2) provide communication control for properly interrogating slave nodes 24 and 28, as well as controlling solicited and unsolicited replies from slave nodes 24 and 28; and (3) receive and transmit data to the decode/encode stage 42 via communication bus MSR DAT. Interface stage 40 can receive inputs and drive outputs to and from a broad range of devices including the aforementioned devices, display 32, DSP 34, and amplifier 36, but one skilled in the art can interface a plurality of other devices to the interface and control stage 40 as required.

Connecting interface and control stage 40 to DSP processor 34, and providing the loudspeaker make, model, and serial number information, as received from slave node 24, can allow DSP 34 to automatically recall loudspeaker preset processing coefficients. This in-turn provides the previously discussed plug-and-play capability, wherein a user simply connects loudspeaker 26, with embedded slave node 24, to amplifier 36 with subsequent attached master node 22, and DSP 34 automatically recalls the proper loudspeaker processing requirements via command from interface and control stage 40. In a similar fashion, connecting interface and control stage 40 to a user interface display device 32 allows the loudspeaker information, status, and diagnostic information to be seen by a user located in different proximity relative to loudspeaker 26 and slave node 24.

Embodiments of communications system 20, also include one or more slave nodes 24 and 28 which are operable to receive the high frequency signals transmitted by the master node 22, reply accordingly, and interface with loudspeaker electronics 26. While certain loudspeaker electronics are illustrated in FIG. 1, and elsewhere, any loudspeaker with any type of internal electronics or circuitry can be connected to a slave node to receive some or all of the benefits described herein. Embodiments of slave node 24 are broadly comprised of a high frequency power recovery stage 56, a high frequency data transceiver 54, a data decoder/encoder stage 52, and an interface and control stage 56. Power recover stage 56 is operable to receive the transmitted power signal PWR_MOD and generate a DC supply voltage PWR used to power the high frequency data transceiver 54, the data decoder/encoder 52, the interface control stage 56, and/or any other peripheral sensors or circuits that may be desired within or attached to slave node 24. Power recovery stage 56 may include a simple voltage regulation circuit to ensure proper voltage potential on PWR. Additionally, the DC output potential PWR of power recovery stage 56 may be summed with a subsequent power supply stage deriving its output from the audio input signal present at the input to the loudspeaker. Such subsequent power supply stages are mentioned in U.S. Pat. No. 8,582,263 by Butler.

High frequency data transceiver 54 operates to (1) receive an outbound downlink data stream DN_DAT from the decode/encode stage 52, and create therefrom a high frequency modulated signal DN_MOD for passage on the loudspeaker wiring; (2) receive the loudspeaker input signal and demodulate therefrom the uplink data stream UP_DAT for passage to the decode/encode stage 52. As discussed earlier, modulation techniques employed within the high frequency transceiver can vary and implementation options can range from complete integrated solutions, to discrete implementations. Frequency allocation of uplink, downlink, and power modulated signals, UP_MOD, DN_MOD, and PWR_MOD are typically selected well above the audio band as shown if FIG. 9.

The data decoder/encoder stage 52 within slave node 24 operates to (1) encode and generate the outbound downlink data DN_DAT, (2) decode the incoming uplink data UP_DAT, and (3) communicate with the interface control stage 50 through the bi-direction data digital data bus SLV_DAT. Data encoding within stage 52 broadly receives communication data SLV_DAT from the interface and control stage 50, applies any desired channel coding, error correction, data packetization, and framing to derive the outbound downlink data signal DN_DAT for passage to the high frequency transceiver stage 54. Similarly, data decoding within stage 52 broadly receives the uplink data stream UP_DAT from high frequency transceiver stage 54 and applies error detection and/or correction, removes framing and/or channel codes, and un-packs the data packets for passage to the interface and control stage 50 via the bi-directional data bus SLV_DAT.

The interface and control stage 50 of slave node 24 operates to (1) interface with external devices and/or sensors within loudspeaker 26 such as digital attenuators, temperature sensors, movement sensors, angle sensors or digital levels, as well as electrical metering devices such as voltage and current meters; (2) provide storage of a unique identifier code (unique address), loudspeaker make, model, and serial number information; (3) provide communication control for properly replying to incoming master node interrogations, as well as controlling unsolicited replies to the master; and (4) receive and transmit data to the decode/encode stage 52 via communication bus SLV_DAT. Interface stage 50 can receive inputs from a broad range of devices including an intelligent digital protection and attenuation circuit as defined in U.S. Pat. No. 8,582,263 by Butler. Similarly, interface and control stage 50 can output signals to a broad range of devices including the aforementioned digital protection and attenuation circuit. In this configuration, interface and control stage 50 can be directly connected to the system control stage operating within the digital protection and attenuation circuit. Interfacing the digital protection and attenuation circuit with the high frequency communication system disclosed within the present invention provides an unprecedented level of control and monitoring in un-powered loudspeakers, wherein a remote device, typically a master node, can change the digital protection and/or attenuation properties, as well as receive all pertinent information from the protection and attenuation circuit.

Interface and control stage 50 operates to provide storage of a unique identifier code and all loudspeaker identification information, such as make, model, and serial number. Unique identifier code UID can be used by the master node to specifically address a single slave node for communication. Ability to specifically address a single slave provides a mechanism to mitigate bus contention, or cases when multiple slaves simultaneously reply. Loudspeaker make, model, and serial number are useful to the master for providing automatic DSP recalls as discussed earlier, or for troubleshooting and diagnostics. The unique identifier UID may be the same as the loudspeaker serial number if so desired.

Figure 2A:
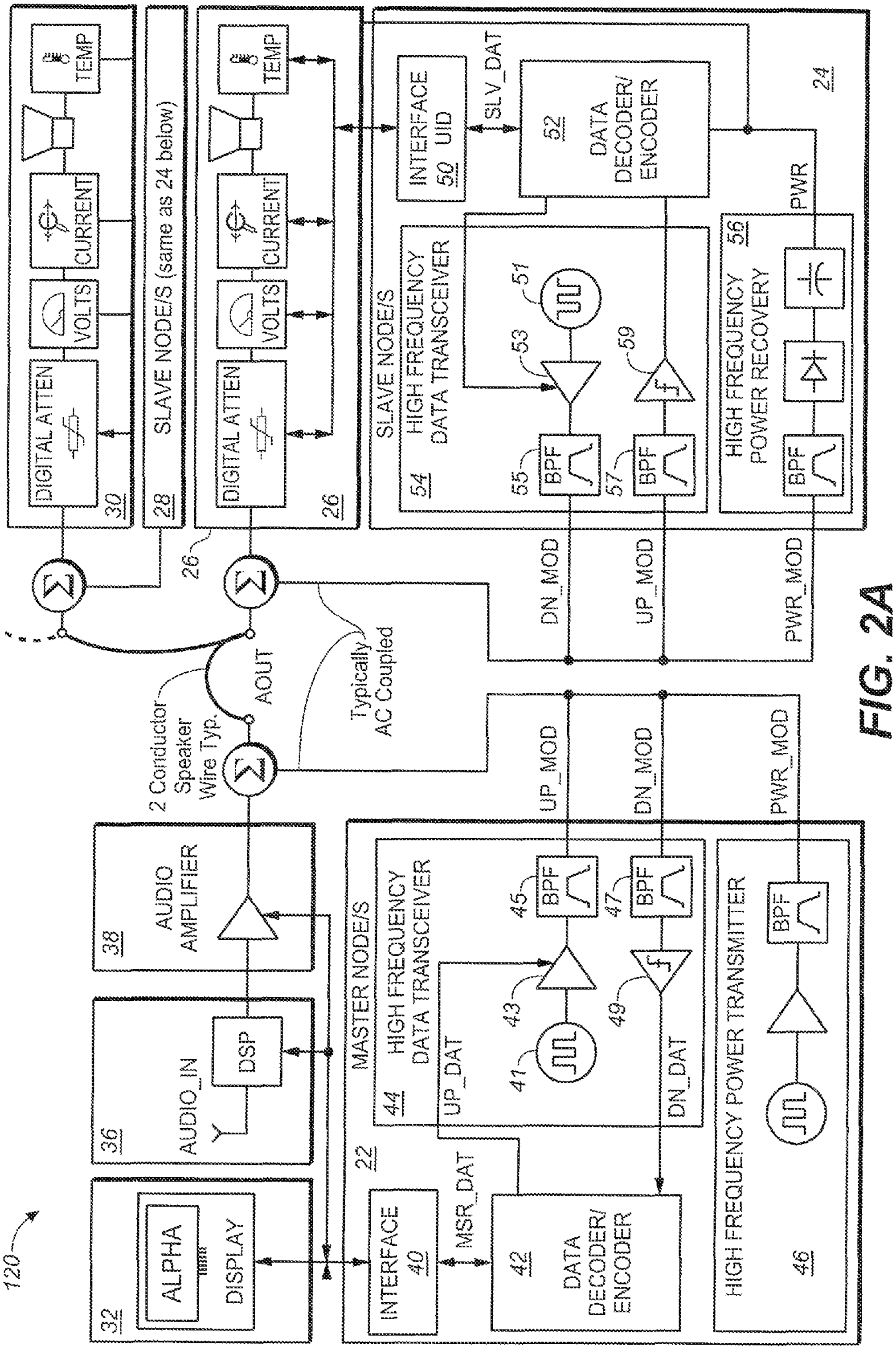
FIG. 2A is a block diagram of an alternate embodiment of a communications system according to the concepts described herein.
Figure 4:
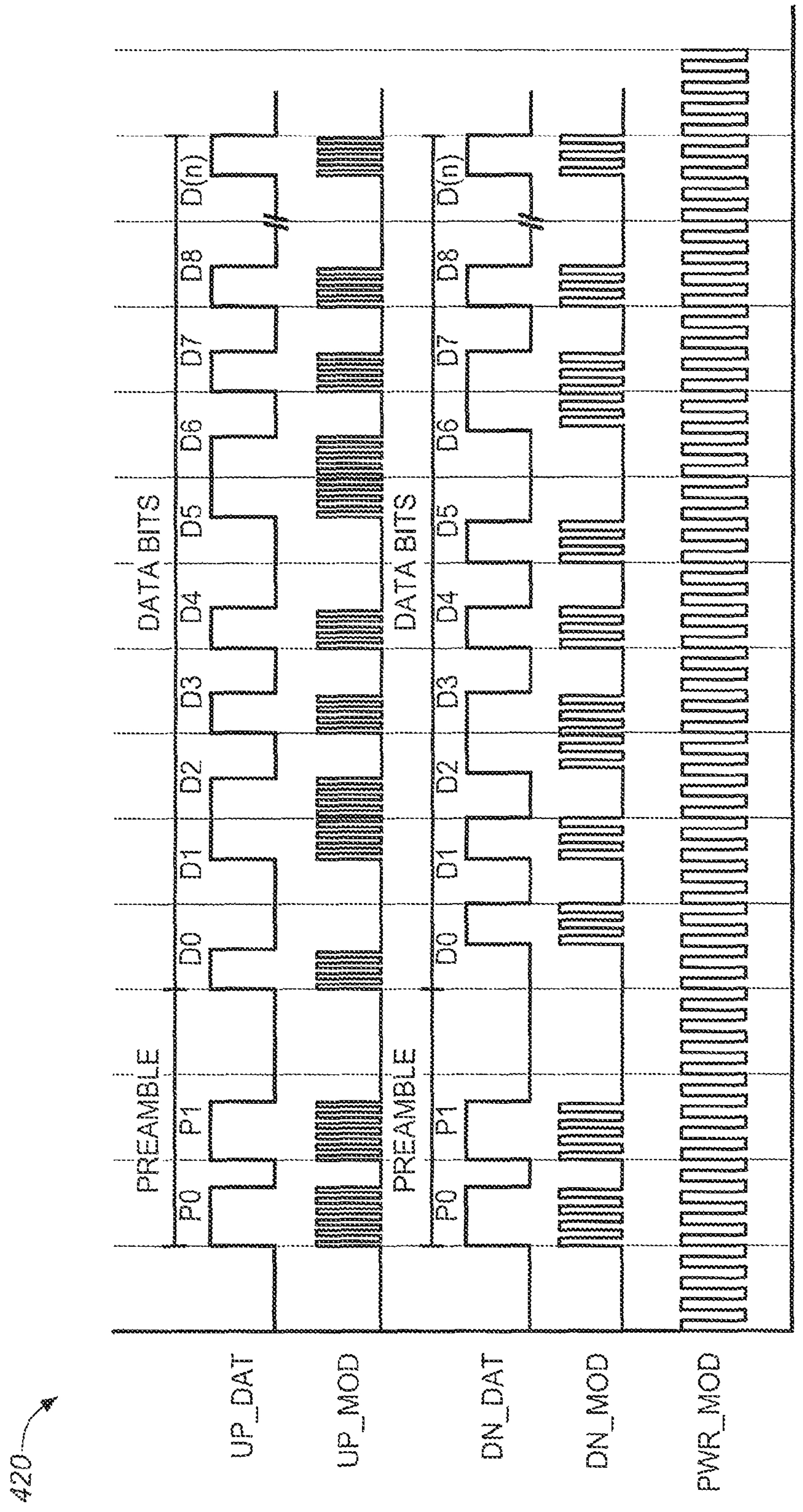
FIG. 4 is a time domain plot of a preferred embodiment modulation scheme for a communications system as described herein.

Referring now to FIG. 2A, a simplified block diagram of an alternate embodiment of a passive loudspeaker digital communication circuit 120 is described. Circuit 120 broadly comprises the same stages as discussed in regards to the embodiment described with respect to FIG. 1, however, the master and slave high frequency transceiver stages 40 and 50 are presented in more detail and utilizing simplified pulse amplitude modulated oscillators for derivation of UP_MOD and DN_MOD signals. In certain embodiments, high frequency data transceiver 44 within master node 22 is operable to modulate the incoming uplink data stream UP_DAT received from the decoder/encoder stage 42 and derive therefrom a high frequency modulated uplink signal UP_MOD using a simplified pulse amplitude modulated oscillator comprised of oscillator 41, gated output driver 43, and band pass filter 45. In this configuration, high frequency transceiver 44 receives the UP_DAT signal from decoder/encoder stage 42 and gates the output of driver 43 directly. Band pass filter 45 is used to limit the spectral content of the resulting pulse amplitude modulated signal and also serves to AC couple the signal to the audio output wiring AOUT. FIG. 4 presents a simple time domain plot of the resulting pulse modulated uplink signal UP_MOD as seen at the output of driver 43 in circuit 120 of FIG. 2A.

Referring again to circuit 120 of FIG. 2A, high frequency transceiver stage 44 within master node 22 is operable to demodulate the downlink signal DN_MOD using band pass filter 47 and envelope detector 49. Band pass filter 47 provides rejection of the adjacent high frequency signals UP_MOD and PWR_MOD, and passes the filtered DN_MOD signal to envelope detector 49 for detection of the data stream. Envelope detector 49 can be implemented with standard devices designed to detect the envelope of a pulse amplitude modulated, high frequency signal. Care must be taken to ensure envelope detector 49 has adequate speed to achieve the desire detection and net propagation time.

Embodiments of high frequency data transceiver 54 within slave node 24 operate to modulate the outbound downlink data stream DN_DAT received from the decoder/encoder stage 52 and derive therefrom a high frequency modulated downlink signal DN_MOD using a simplified pulse amplitude modulated oscillator. Wherein said pulse amplitude modulated oscillator is comprised of oscillator 51, gated output driver 53, and band pass filter 55. In this configuration, high frequency transceiver 54 receives the DN_DAT signal from decoder/encoder stage 52 and gates the output of driver 53 directly. Band pass filter 55 is used to limit the spectral content of the resulting pulse amplitude modulated signal and also serves to AC couple the signal to the loudspeaker input wiring AOUT. FIG. 4 presents a simple time domain plot of the resulting pulse modulated downlink signal DN_MOD as seen at the output of driver 53 in FIG. 2A.

High frequency transceiver stage 54 within slave node 24 operates to demodulate the uplink signal UP_MOD using band pass filter 57 and envelope detector 59. Band pass filter 57 provides rejection of the adjacent high frequency signals DN_MOD and PWR_MOD, and passes the filtered UP_MOD signal to envelope detector 59 for detection of the data stream UP_DAT. Similar to the master node, envelope detector 59 can be implemented with standard devices designed to detect the envelope of a pulse amplitude modulated, high frequency signal. Care must be taken to ensure envelope detector 59 has adequate speed to achieve the desire detection and net propagation time.

Figure 2B:
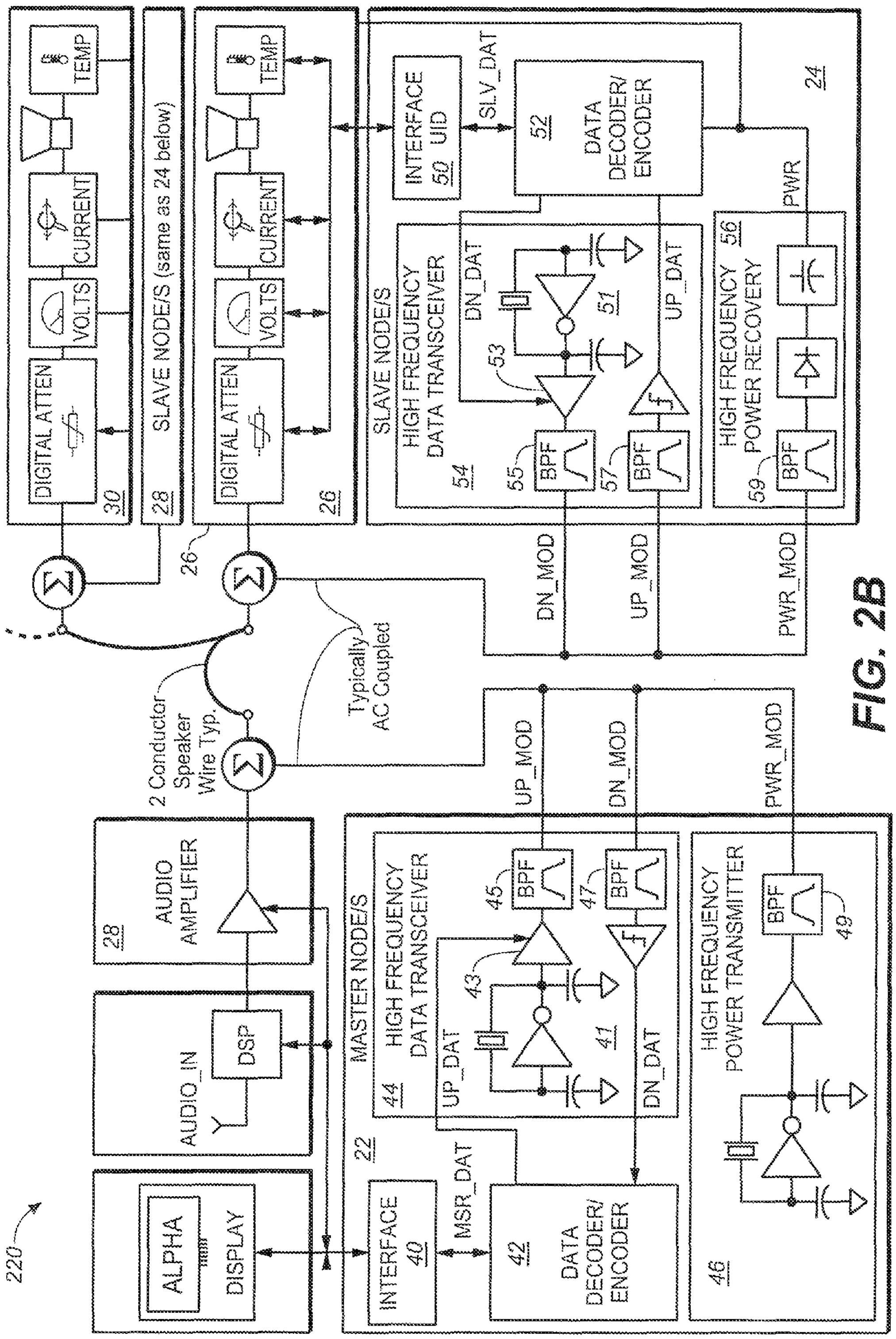
FIG. 2B is a block diagram of an alternate embodiment of communications system shown in FIG. 2A.

Referring now to FIG. 2B, a secondary block diagram of an alternate embodiment of a passive loudspeaker digital communication circuit 220 is described. Circuit 220 broadly comprises the same stages as discussed in regards to the embodiment described with respect to FIG. 2A, however, the oscillator used in both master and slave high frequency transceiver stages 40 and 50 are presented as traditional logic gate resonant feedback oscillators incorporating a resonant device such as a quartz crystal or ceramic resonator. Band pass filters 45 and 49 within master node 22 high frequency transceiver 44 and power transmitter 46, are used to limit the spectrum of the outbound transmission signals UP_MOD and PWR_MOD. Said band pass filters 45 and 49 also provide high impedance for out-of-band signals, such as the adjacent high frequency modulated signals. For example, band pass filter 45 allows UP_MOD to pass with minimal attenuation at the predetermined frequency of UP_MOD, and provides a higher impedance at the adjacent frequency used by the power transmitter and subsequent high frequency modulated power signal PWR_MOD.

Similar to master node 22 band pass filters 45, 47, and 49, slave node 24 can contain band pass filters 55, 57, and 59 for spectral filtration and isolation of the desired high frequency modulated signal UP_MOD, DN_MOD, or PWR_MOD. In certain embodiments, band pass filter 57 can be tuned to allow slave node decoder/encoder stage 52 to receive its own downlink modulated signal DN_MOD, wherein the slave interface and control stage 50 can listen to its own downlink transmission, as well as other loudspeakers residing on the line. This is beneficial for monitoring high frequency transceiver 54 as well as establishing communication between multiple slaves residing on the loudspeaker wiring, such as slave node 28.

Figure 3:
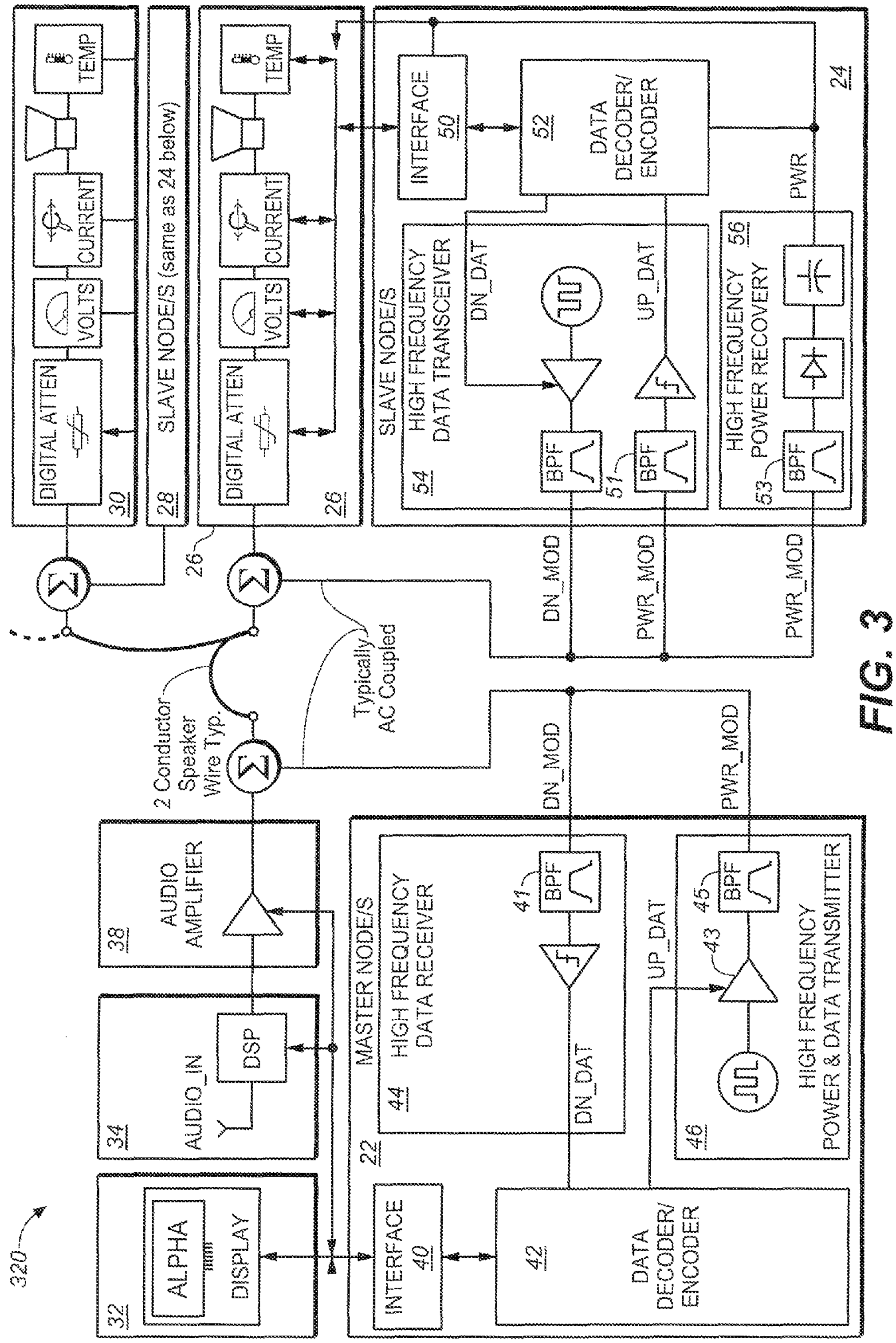
FIG. 3 is a block diagram of an alternate embodiment of a communications system according to the concepts described herein.

Referring now to FIG. 3, a simplified block diagram of an alternate embodiment of a passive loudspeaker digital communication circuit 320 is described. Circuit 320 broadly comprises the same stages as discussed in regards to the embodiment described with respect to FIG. 2A, however, the transmitter in master node 22 high frequency transceiver 44 has been removed, and a pulse amplitude modulated control has been added to high frequency power transmitter 46. In certain embodiments, it is beneficial to reduce cost by combining the uplink modulator, formerly contained within high frequency transceiver stage 44, with the high frequency power modulator 46. In this configuration, uplink data is modulated on the power transmission signal PWR_MOD by gating the high frequency power transmission oscillator via gated output driver 43. Similar to the previously discussed embodiment in FIGS. 2A and 2B, modulating the high frequency power transmitter with the uplink data signal UP_DAT will be identical, yet logically inverted. This is best seen in the time domain plot presented of FIG. 5, wherein the continuously running power transmission PWR_MOD periodically ceases oscillation during active-high data pulses on UP_DAT. In this embodiment, PWR_MOD is used for two distinct purposes (1) to transmit a high frequency powering signal, and (2) to carrier uplink data from master node 22 to slave node 24. Therefore, it is beneficial to ensure the power modulated output signal PWR_MOD maintains a minimal transmission duty cycle to achieve proper powering of slave nodes, such as nodes 24 and 26. With this in mind, channel coding is typically employed to ensure adequate on time, wherein the high frequency power transmitter is continuously transmitting. Referring again to time domain plot FIG. 5, it can be seen that PWR_MOD is Manchester Encoded and continuously preserves a high duty cycle of active oscillation during the transmission of logic ones and zeros.

While the concepts described herein broadly relate to the physical layer of a digital communication and identification system for passive loudspeakers and is not limited to any one data signaling or protocol scheme, the invention also encompasses a simple protocol and signaling layer for practical applications. Various embodiments of the invention have been developed with two predominant protocols (1) a clocked signaling scheme requiring at least 2 uplink signals (1 clock, 1 data), and (2) a pulse width, pulse position signaling scheme requiring only one uplink or downlink data signal. Though the aforementioned embodiments can operate with a variety of protocols and signaling techniques, certain preferred embodiments of the present invention can operate using the pulse width, pulse position signaling as shown in the time domain plot of FIG. 4. All data transmissions within time domain plot 420 start with a simple preamble consisting of a pulse amplitude modulated waveform, followed by a data payload section, wherein the data is signaled using a combination of Manchester encoding and pulse width variations to represent logic high and logic low data bits. The data payload section can include address, data, and/or error correction/detection bits. Preamble pulses are signaled using a wider pulse width than the subsequent data pulse, and the data payload section DATA BITS starts at a fixed time location relative to the start of the preamble pulse P0. This technique eliminates the requirement for a clocking signal as the data is synchronized in time relative to the preamble symbol transmission.

Figure 5:
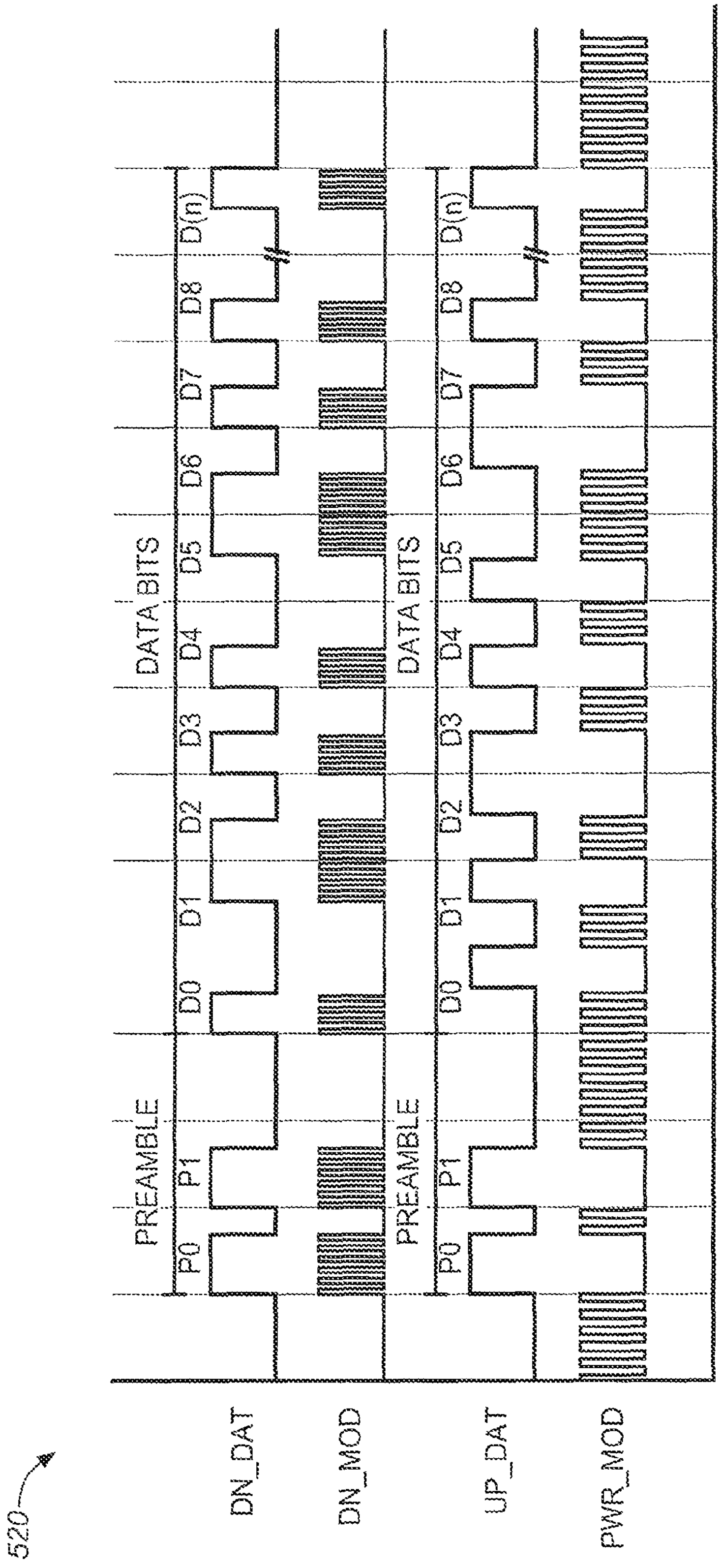
FIG. 5 is a time domain plot of an alternate embodiment of a modulation scheme.

Referring to FIG. 5, a time domain plot of a pulse width, pulse position signaling technique is presented. Time domain plot 520 broadly comprises the same waveforms as discussed in regards to the embodiment described with respect to FIG. 4, however, the uplink transmission signal has been combined with the high frequency power transmission signal PWR MOD as discussed in respect to FIG. 3. The signaling technique presented in time domain plot 520 eliminates the requirement for a clocking signal and eliminates the transmission of an additional uplink data signal by embedding the uplink data transmission into the high frequency modulated power signal PWR_MOD.

Figure 6:
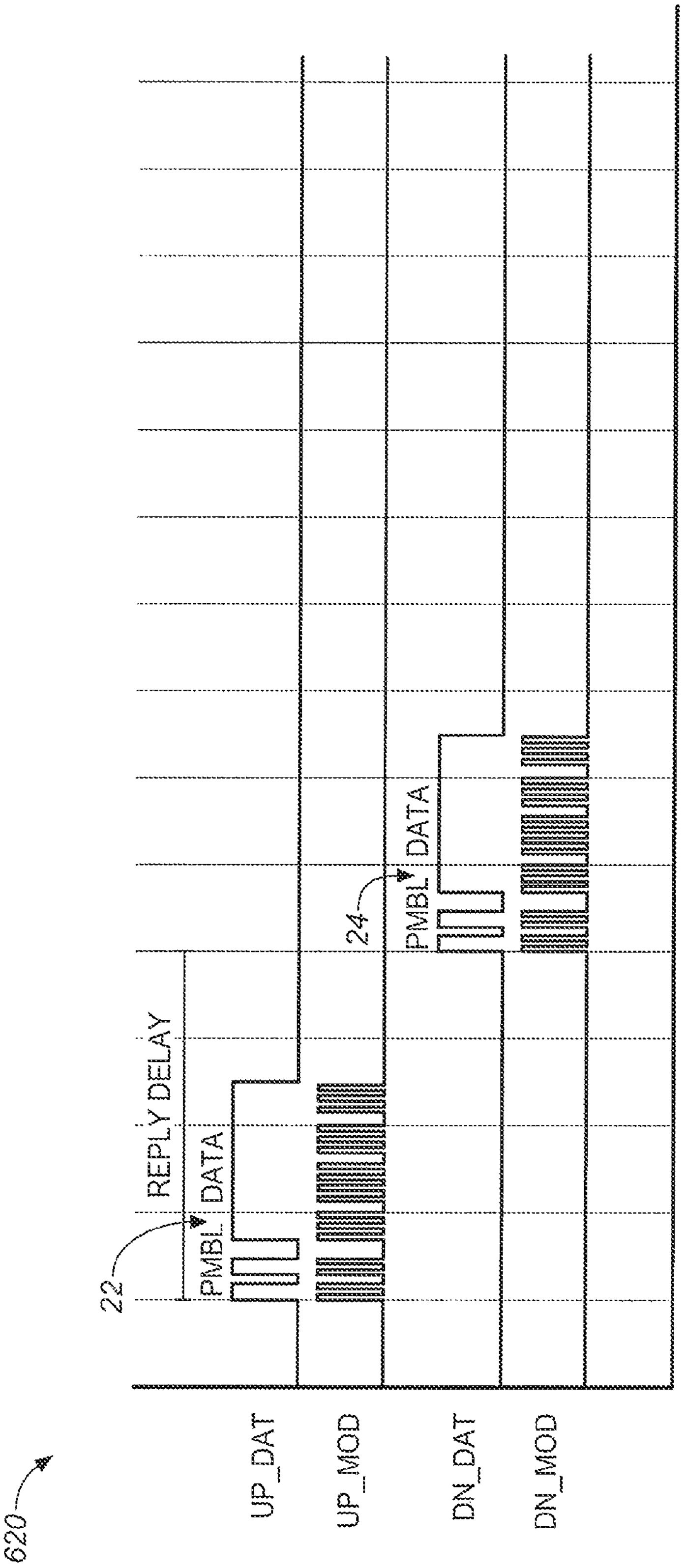
FIG. 6 is a time domain plot of a preferred embodiment of a time division multiplexing scheme for a communications system as described herein.
Figure 7:
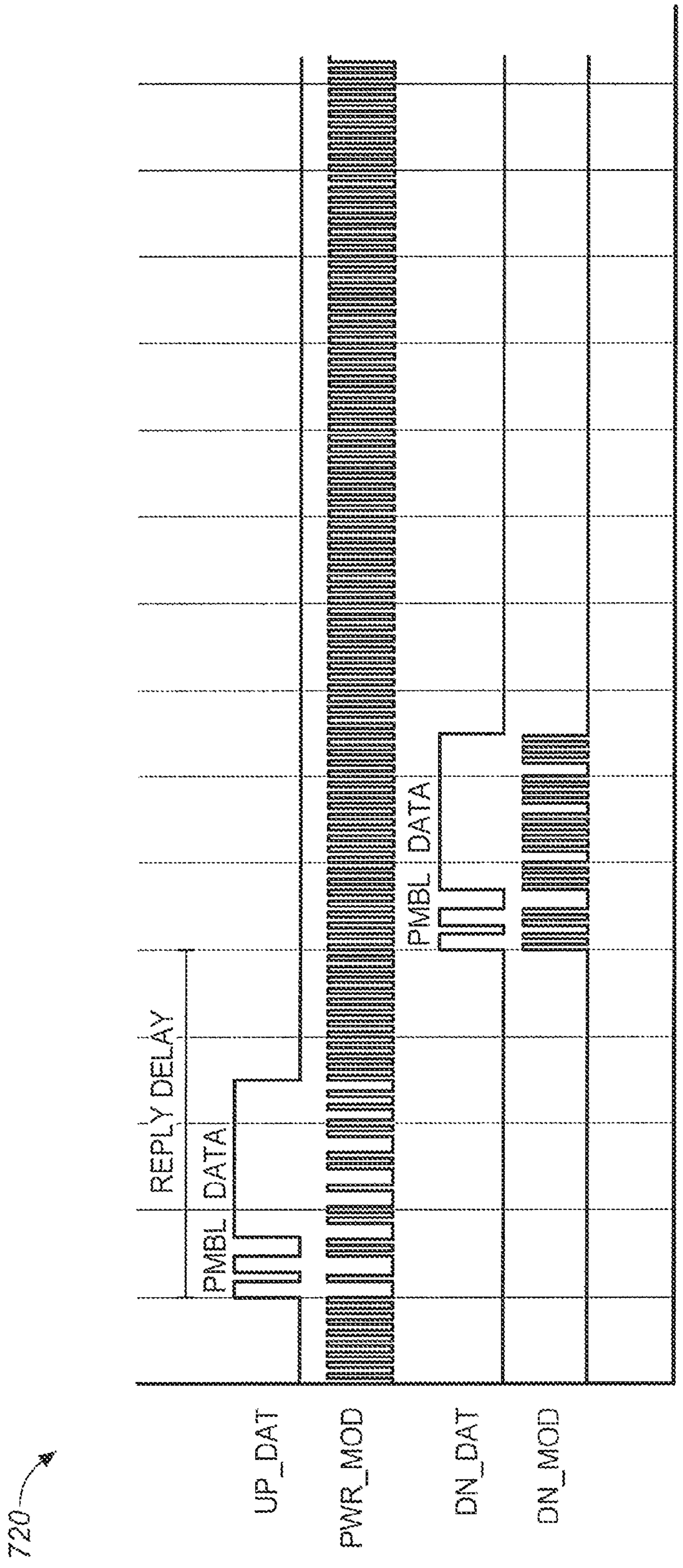
FIG. 7 is a time domain plot of an alternate time division multiplexing scheme.

In certain embodiments, the present invention can benefit by incorporating a time division multiplexing scheme as illustrated in the time domain plot of FIG. 6. Time domain plot 620 illustrates a simple interrogation-reply protocol, wherein the master node transmits an uplink interrogation 22 and the slave node subsequently transmits a downlink reply 24 later in time. The reply delay REPLY DELAY is typically a constant, predetermined time that positions the downlink reply 24 at a synchronized time following the preamble of uplink transmission 22. Referring to FIG. 7, an alternative time domain plot incorporating the aforementioned time division multiplexing scheme is presented. Time domain plot 720 broadly contains the same waveforms as discussed in regards to the signaling scheme described in respect to FIG. 6, however, the uplink modulated signal is embedded into the high frequency modulated signal PWR_MOD as previously discussed.

Figure 8:
FIG. 8 is a time domain plot of a bus contention mitigation scheme for a communications system as described herein.

Referring to FIG. 8, a time domain plot of an alternative time division multiplexed protocol is presented. Time domain plot 820 illustrates a simple and effective approach employed within certain embodiments of the invention to deal with bus contention. Bus contention can occur when multiple slaves are residing on the bus, a single pair of loudspeaker wires, and two or more slaves are simultaneously transmitting at the same frequency. To handle this scenario the present invention has been implemented with a simple protocol, wherein the master node can transmit an all-call interrogation 22 onto the bus. When the all-call interrogation is received by the slave nodes, each slave randomly determines a reply delay time 30, 32, and 34, thereby reducing bus contention issues.

Because all-call interrogations will result in all slaves responding to the master, randomizing the reply delay time, the time in which the individual slaves reply, minimizes the potential for bus conflicts. However, random reply delay will not eliminate bus contention as can be seen by the overlapping collision of slave 1 reply 24 and slave 2 reply 26. Therefore, in addition to randomized reply delay, the master checks for error-free receptions received from slaves in response to the all-call interrogation, and transmits an acknowledgment command to each slave that successfully reported in, wherein that slave will disable replies to subsequent all-call interrogations. This can be seen in the successful reply transmission of slave 3 reply 28, and the subsequent acknowledgement uplink interrogation 29 uniquely identifying slave 3 using the UID. This technique, referred to within the present invention as all-call suppression, ensures that future all-call interrogations will not be responded to by slaves that have been identified by the master. All call suppression requires the master node to have the ability to uniquely identify and address a specific slave, as discussed in regards to FIG. 1 unique identifier UID. Utilizing random reply delay and all-call suppression techniques provides ample bus mitigation to identify all slave devices residing on the bus.

It should be obvious to one skilled in the art of digital communication design, that the present invention can be implemented utilizing a variety of digital techniques and devices. One such technique that can be implemented within the present invention is Orthogonal Frequency Division Multiplexing (OFDM), wherein a plurality of transmit carrier frequencies are created using an inverse Fast Fourier transform (FFT) algorithm and the high frequency receiver utilizes a forward FFT for demodulation. Such an implementation would provide significant channel data throughput, but the cost would be higher than a simple implementation with minimized uplink and downlink carrier frequencies.

The overall result of the concepts described herein is a digital communication system allowing data transmission and reception between multiple loudspeakers and multiple remote transceivers. The communications system described herein allows the loudspeaker to report system information, status, voltage & current levels, temperatures, impedance, cable phase, tilt angle, and many other parameters to the master node. These system and operational parameters can then be utilized by the master to automatically recall signal processing settings, update monitors, warn users of problems, and/or help diagnose wiring or loudspeaker faults. Additionally, the digital communication system described herein can be utilized alongside a digital attenuation and protection circuit to control protection parameters or adjust the desired attenuation of an individual speaker within a series or parallel group of loudspeakers. In this way, the present invention allows an operator to turn up or down and individual slave node that is outfitted with a digital attenuation device.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A communication system for communicating between audio equipment, a first loudspeaker and a second loudspeaker, wherein the first loudspeaker and the second loudspeaker are connected to the audio equipment over a standard two-wire speaker wire, the communication system comprising:

a master node in electrical communication with the audio equipment and the first loudspeaker using the standard two-wire speaker wire, wherein the master node includes a data encoder and a data transceiver, wherein the data encoder is operable to encode data signals, wherein the data transceiver is operable to place the data signals having been encoded onto the standard two-wire speaker wire at frequencies above audio frequencies, and wherein the standard two-wire speaker wire is operable to simultaneously transmit both an analog audio signal and the data signals;

a first slave node in electrical communication with the master node and the first loudspeaker using the standard two-wire speaker wire, wherein the first slave node includes a data transceiver, a data decoder and an interface, wherein the data transceiver in the first slave node is operable to receive the data signals from the master node using the standard two-wire speaker wire, and wherein the interface communicates with electronics in the first loudspeaker; and a second slave node in electrical communication with the master node and the second loudspeaker using the standard two-wire speaker wire, wherein the standard two-wire speaker wire comprises a single pair that connects the first slave node and the second slave node in series to the master node, wherein the master node, the first slave node and the second slave node are operable to mitigate contention of communications between the master node, the first slave node and the second slave node.

2. The communication system of claim 1, wherein the master node, the first slave node and the second slave node are operable to mitigate contention using an interrogation, a first response associated with the first slave node, and a second response associated with the second slave node.

3. The communication system of claim 2, wherein the first slave node is operable to randomly determine a first reply delay and to send the first response in response to the interrogation following the first reply delay, and wherein the second slave node is operable to randomly determine a second reply delay and to send the second response in response to the interrogation following the second reply delay.

4. The communication system of claim 1, wherein the electronics in the first loudspeaker includes one or more of sensors, meters, modulators, amplifiers or attenuators.

5. The communication system of claim 1, wherein the master node further comprises a high-frequency power transmitter operable to place a power signal on the standard two-wire speaker wire at frequencies above the audio frequencies, and wherein the first slave node further comprises a power recovery circuit operable to receive the power signal from the master node and to use the power signal to provide the power necessary to operate the first slave node.

6. The communication system of claim 1, wherein the data encoder of the master node is further operable to decode data, and wherein the data transceiver of the master node is further operable to receive slave data signals from the first slave node, such that the master node is further operable to receive the slave data signals from the first slave node and to pass data in the slave data signals to the audio equipment.

7. The communication system of claim 1, further comprising multiple loudspeakers connected in series via the single pair to the audio equipment, wherein each loudspeaker of the multiple loudspeakers has an associated slave node operable to communicate with the master node.

8. The communication system of claim 1, wherein the communication system is operable to broadcast identification messages to remote devices connected to the standard two-wire speaker wire.

9. The communication system of claim 1, wherein each node in the communication system has a unique identifier and each transmission is addressed using the unique identifier.

10. The communication system of claim 1, wherein the first slave node is operable to receive a control signal in the data signals from the master node, and responsive to the control signal, to control a parameter of the first loudspeaker.

11. The communication system of claim 1, wherein the first slave node and the second slave node are operable to receive a control signal in the data signals from the master node, wherein the master node is operable to transmit an identifier with the control signal in the data signals, wherein the identifier identifies one of the first slave node and the second slave node, wherein the first slave node and the second slave node are operable to respond to the control signal such that if the control signal indicates the first slave node, the first slave node is responsive to the control signal and the second slave node is not responsive to the control signal, and wherein the first slave node and the second slave node are operable to respond to the control signal such that if the control signal indicates the second slave node, the second slave node is responsive to the control signal and the first slave node is not responsive to the control signal.

12. A method of communicating between audio equipment, a first loudspeaker and a second loudspeaker over a standard two-wire speaker wire, wherein the standard two-wire speaker wire comprises a single pair that connects the first loudspeaker and the second loudspeaker in series to the audio equipment, the method comprising:

modulating, by a master node in electrical communication with the audio equipment and the first loudspeaker using the standard two-wire speaker wire, a master data signal on the standard two-wire speaker wire at a data signal frequency above audio frequencies, wherein the standard two-wire speaker wire is operable to simultaneously transmit both an analog audio signal and the master data signal;

mitigating contention of communications on the standard two-wire speaker wire between the master node, a first slave node and a second slave node, wherein the first slave node is associated with the first loudspeaker, and wherein the second slave node is associated with the second loudspeaker;

receiving, by the first slave node and the second slave node, the master data signal via the standard two-wire speaker wire; and passing information in the master data signal to electronics in one of the first loudspeaker and the second loudspeaker.

13. The method of claim 12, wherein mitigating contention comprises:

sending, by the master node on the standard two-wire speaker wire, an interrogation;

sending, by the first slave node on the standard two-wire speaker wire, a first response to the interrogation after a first reply delay; and sending, by the second slave node on the standard two-wire speaker wire, a second response to the interrogation after a second reply delay.

14. The method of claim 13, wherein mitigating contention further comprises:

randomly determining, by the first slave node, the first reply delay; and randomly determining, by the second slave node, the second reply delay.

15. The method of claim 12, wherein the electronics in one of the first loudspeaker and the second loudspeaker includes one or more of sensors, meters, modulators, amplifiers or attenuators.

16. The method of claim 12, further comprising:

transmitting, by the master node, a power signal on the standard two-wire speaker wire at a power signal frequency above the audio frequencies;

using the power signal to power electrical components of the first slave node, wherein the first slave node is in communication with the electronics in the first loudspeaker; and using the power signal to power electrical components of the second slave node, wherein the second slave node is in communication with the electronics in the second loudspeaker.

17. The method of claim 12, further comprising:

receiving, by the master node, slave data signals from the first slave node on the standard two-wire speaker wire; and passing data in the slave data signals to the audio equipment.

18. The method of claim 12, wherein multiple loudspeakers are connected in series via the single pair to the audio equipment, wherein each loudspeaker of the multiple loudspeakers has an associated slave node operable to communicate with the master node.

19. The method of claim 12, wherein the master node is operable to broadcast identification messages to remote devices connected to the standard two-wire speaker wire.

20. The method of claim 12, wherein each node has a unique identifier and each transmission is addressed using the unique identifier.

* * * * *